United States Patent
Hinkley

[15] 3,671,549
[45] June 20, 1972

[54] PROCESS FOR PREPARING ASCORBYL-3-PHOSPHATE AND SALTS THEREOF

[72] Inventor: David F. Hinkley, Plainfield, N.J.
[73] Assignee: Merck & Co., Inc., Rahway, N.J.
[22] Filed: March 5, 1970
[21] Appl. No.: 16,940

Related U.S. Application Data

[63] Continuation-in-part of Ser. No. 578,983, Sept. 13, 1966.

[52] U.S. Cl. ...........................................................260/343.7
[51] Int. Cl. ........................................................C07d 5/12
[58] Field of Search..............................................260/343.7

[56] References Cited

UNITED STATES PATENTS 2,443,473  6/1948  Milas ...................................260/343.7
3,188,309  6/1965  Mukaujana et al. ............260/343.7 X

FOREIGN PATENTS OR APPLICATIONS 1,805,598  5/1969  Germany ............................260/343.7

OTHER PUBLICATIONS

Gazz, Chem. Ital., Vol. 91, No. 8/9, pp. 964– 972, Aug. 1 Sept. 1961).

Primary Examiner—Nicholas S. Rizzo
Assistant Examiner—Anne Marie T. Tighe
Attorney—John Frederick Gerkens, J. Jerome Behan and I. Louis Wolk

[57] ABSTRACT

A process for the preparation of ascorbyl-2-phosphate and the alkali or alkaline earth metal salts which comprises reacting ascorbic acid or the alkali metal or alkaline earth metal salts thereof sequentially with a phosphorylating agent, water, and an alkali or alkaline earth meal base. The ascorbyl-2-phosphate is useful as a stabilized form of Vitamin C.

6 Claims, No Drawings

PROCESS FOR PREPARING ASCORBYL-3-PHOSPHATE AND SALTS THEREOF

CROSS-REFERENCE TO RELATES APPLICATIONS

This application is a continuation-in-part of copending application Ser. No. 578,983, filed on Sept. 13, 1966, now abandoned

BACKGROUND OF THE INVENTION

This invention relates to a new process of preparing a stabilized form of Vitamin C, otherwise known as ascorbic acid. In particular, the invention relates to a novel process for the preparation of ascorbyl-3-phosphate.

It is known that Vitamin C has a tendency to lose its potency due to high sensitivity of the enolic hydroxyl groups of the lactone ring to aerial oxidation. In order to prevent this oxidation, one of these hydroxyl groups may be blocked, for example, by formation of an ester thereof. Unfortunately, the esterification of such hydroxyl groups often brings about loss in potency of the vitamin for a different reason, namely, the resistance of many such ester groupings to in vivo cleavage. Thus, it is deemed desirable to protect the vitamin against aerial oxidation by means of a group which is stable to in vitro hydrolysis, yet is readily hydrolyzed under in vivo conditions, for example, by gastric enzymes. It has been found that the 3-phosphate ester of the enol form of L-ascorbic acid meets the desired criteria of in vitro stability and in vivo availability.

A process is known to the art whereby this compound may be prepared in several steps, namely by conversion of L-ascorbic acid to the corresponding 5,6-0- isopropylidene L-ascorbic acid which is then phosphorylated and alkalized to give an alkali metal salt of the desired phosphoric ester of L-ascorbic acid.

SUMMARY OF THE INVENTION

The process of the present invention enables the production of the phosphate ester of ascorbic acid itself or a metal salt thereof to be produced by direct phosphorylation of ascorbic acid metal salts by the use of inexpensive phosphorylating agents.

In the process of the present invention, ascorbic acid or a metal salt of ascorbic acid, for example, an alkali or alkaline earth metal salt of ascorbic acid preferably of L-ascorbic acid, suitably the sodium, potassium, calcium or magnesium salt, is suspended in a suitable organic reaction medium, an oxygenated non-hydroxylic solvent, such as acetone or tetrahydrofuran being preferred and treated with a phosphorylating agent. Among the suitable phosphorylating agents are phosphoryl halides, for example, phosphoryl chloride or bromide, phosphoric and halophosphoric acids, for example, dichlorophosphoric acid, chlorophosphoric acid, and bromophosphoric acid and the corresponding anhydrides thereof, suitably pyrophosphoryl chloride or bromide and polyphosphoric acid. The reaction mixture is quenched with water and the reaction mixture neutralized with a base. The preferred bases are the alkali and alkaline earth metal hydroxides, such as sodium, potassium, calcium or magnesium hydroxide or the corresponding carbonates. Where it is desired to isolate the product in the form of the metal salt, an excess of base is added. The amount of base used determines whether the mono-, di-, or tri-metal salt is isolated. The salt is precipitated by slow addition of a lower alkanol, suitably methanol and the product isolated from the slurry thus formed. In a suitable isolation procedure, the reaction mixture is filtered, washed with alkanol and dried in vacuo.

The mono- and di-metal salts of ascorbyl-3-phosphate may also be prepared by either of two methods. In one modification of the process, the tri-metal salt is dissolved in water, the requisite amount of acid added and the product isolated. Preferably, the isolation is achieved by precipitation of the mono- or di-metal salt, by the addition of an alkanol, suitably methanol. In the other modification of the process, ascorbyl-3-phosphate is treated with the desired amount of alkali metal or alkaline earth metal base and the product isolated in a similar manner.

Where it is desired to isolate the free enol phosphate, merely sufficient base to neutralize the reaction mixture is added. If necessary, an unreactive inorganic salt such as sodium chloride is added to the reaction mixture causing a separation of aqueous and organic layers. The product is then isolated, suitably by separation and concentration of the organic layer to yield the ascorbyl-3-phosphate as a liquid.

DESCRIPTION OF THE PREFERRED EMBODIMENT

In a preferred embodiment of the procedure, the metal salt of L-ascorbic acid, suitably sodium L-ascorbate is suspended in approximately the same weight of acetone at a temperature of from between $-20°$ to $+10°$ C. under an inert atmosphere, an atmosphere of nitrogen being especially suitable and there is added thereto slightly less than an equimolar amount of the phosphorylating agent in approximately twice its weight of acetone. It is preferred to maintain the temperature of the reaction mixture between $-20°$ and $0°$ C. during the course of the addition. The reaction mixture is then stirred at a temperature of between $0°$ and $+5°$ C., for from 1 to 2 hours and quenched by the slow addition of water at ambient temperatures (between $15°$ and $30°$ C.). The reaction mixture is then neutralized, suitably by addition of sodium or potassium hydroxide.

Where it is desired to form the tri-metal salt of L-ascorbyl-3-phosphate, base is added until the pH is greater than 9. Any unreacted ascorbic acid is then destroyed by passing air through the vigorously agitated solution from about 1 to about 2 hours. The metal salt is then isolated, preferably by addition of methanol at a temperature of between $30°$ and $50°$ C. The resulting slurry is cooled to from about $0°$ to about $5°$ C. for from 1 to 3 hours, filtered, the filter cake washed with methanol and the product dried in vacuo at a temperature not exceeding $50°$ C.

It should be noted, of course, that where the metal is an alkali metal, for example, sodium, the product is L-ascorbyl-3-phosphate trisodium salt, while where the metal is an alkaline earth metal, two equivalents of the acidic moiety are required for each 3 ion moles of metal. Thus, where the metal is an alkaline earth metal, for example, calcium, the tri-metal salt would be the di(L-ascorbyl-3-phosphate)tricalcium salt.

The mono- and di-metal salts may be prepared by the partial acidification of the tri-metal phosphate ester of ascorbic acid, for example, the trialkali or trialkaline earth metal salts of L-ascorbyl-3-phosphate, suitably, the trisodium, tripotassium or trimagnesium salt is dissolved in water and one or two equivalents of acid added per ion mol of phosphate ester moiety. A mineral acid such as aqueous hydrochloric or aqueous sulfuric acid may be used. Alternatively, an organic acid such as an alkanoic acid, for example, acetic acid is also suitable. Where one equivalent of acid is used, the product is the corresponding di-metal salt and where two equivalents of acid are used, the product is the corresponding mono-metal salt. The product is then isolated, suitably by addition of a lower alkanol, such as methanol followed by vigorous agitation at about $30°-40°$ C. to coagulate the product. The reaction mixture is then cooled to between $5°$ and $10°$ C., filtered, washed with more alkanol and dried in vacuo.

These products may also be prepared starting with the free enol phosphate of ascorbic acid by adding one or two equivalents of the desired alkali or alkaline earth metal base, per equivalent of phosphate ester. Among the suitable bases are sodium hydroxide, sodium carbonate, sodium bicarbonate, potassium hydroxide and calcium carbonate. For ease of reaction, however, it is preferred to use the form of base which has the greatest solubility in water. In the preferred procedure, the free enol phosphate ester is dissolved in water and an aqueous solution of the desired base added thereto. The product is then isolated, the preferred method of isolation being by precipitation with an alkanol in the manner noted above.

Where it is desired to isolate the free enol phosphate of ascorbic acid, the addition of the base, for example, aqueous sodium hydroxide, to the quenched phosphorylated reaction mixture is strictly controlled so that the reaction mixture is brought to a pH not in excess of 2. Where a sufficiently concentrated solution of base is used, for example, a solution containing at least 40 percent by weight of sodium hydroxide, the aqueous and organic layers are separated and the free enol phosphate produced will be salted into the organic layer. However, in order to ensure total salting out, it is preferred to add a non-reacting inorganic salt, sodium chloride being suitable, to the reaction mixture until the inorganic salt no longer dissolves in the aqueous layer. The organic layer is then separated, the aqueous layer extracted with the same solvent and the combined organic layers evaporated under reduced pressure to yield the desired product, L-ascorbyl-3-phosphate.

L-ascorbyl-3-phosphate may also be prepared by treating a tri-metal salt of L-ascorbyl-3-phosphate ester, for example, the L-ascorbyl-3-phosphate trisodium salt or the di(L-ascrobyl-3-phosphate)trimangnesium salt with exactly three equivalents of an acid per equivalent of salt, suitably mineral acid, such as aqueous sulfuric or aqueous hydrochloric acid is employed. The product is then isolated by the salting out procedure described above.

In accordance with the above procedure, there is produced L-ascorbyl-3-phosphate and the corresponding alkali and alkaline earth metal salts thereof. Specifically produced are L-ascorbyl-3-phosphate trisodium salt, L-ascorbyl-3-phosphate tripotassium salt, di(L-ascrobyl-3-phosphate)trilithium salt, di(L-ascorbyl-3-phosphate)tri-calcium salt, di(L-ascorbyl-3-phosphate)trimagnesium salt, L-ascorbyl-3-phosphate disodium salt, L-ascorbyl-3-phosphate monocalcium salt, L-ascorbyl-3-phosphate monomagnesium salt, L-ascorbyl-3-phosphate monopotassium salt, di(L-ascrobyl-3-phosphate)monolithium salt, di(L-ascorbyl-3-phosphate) monomagnesium salt. Similarly, there may be produced the corresponding D-ascorbyl-3-phosphate and the metal salts thereof.

The following examples are given for the purpose of illustration and not by way of limitation.

EXAMPLE 1

To 198 g. (1.0 mol) of sodium L-ascorbate suspended in 198 ml. of acetone at −10° C. under nitrogen is added a mixture of 145.8 g. (0.95 mol) of phosphoryl chloride in 300 ml. of acetone over 4 hours at −10° C. The mixture is stirred an additional hour at 0° C. and then quenched by adding 100 ml. of water over 1 hour at 25° C. Aqueous sodium hydroxide (500 ml. of 40 percent solution) is then added to form the trisodium salt (pH 9.3 ) and air is sparged through the stirring solution for one hour to destroy residual ascorbic acid. The trisodium salt of the enol phosphate is then precipitated by adding 2 liters of methanol over 1 hour at 40° C. The resulting slurry is cooled to 0°–5° C. for74cake washed with 3 × 50 ml. of methanol and the material dried at 40° C. in vacuo. There is thus produced, L-ascorbyl-3-phosphate trisodium salt. The compound does not reduce iodine and absorbs in the U.V. at 265 $\mu$ at pH 9.0 and at 237 $\mu$ at pH 1.0.

In accordance with the above procedure, but using potassium, lithium or calcium hydroxide, or magnesium oxide in place of sodium hydroxide, there is obtained L-ascorbyl-3-phosphate tripotassium salt, di(L-ascorbyl-3-phosphate)trilithium salt, di(L-ascorbyl-3-phosphate)tricalcium salt, or di(L-ascorbyl-3-phosphate)trimagnesium salt.

In accordance with the above procedure, but using the corresponding metal carbonates, there are obtained the same products.

EXAMPLE 2

35.8 gms. (0.1 mol) of L-ascorbyl-3-phosphate trisodium salt are suspended in 40 ml. of acetone under nitrogen and there is added thereto 50 ml. of 2N-hydrochloric acid over 2 hours at 15° C. The mixture is stirred for an hour and 200 ml. of methanol added thereto. The mixture is stirred for a further hour at 40° C., filtered and the filter cake washed with methanol and the product dried at 40° C. in vacuo. There is thus produced, L-ascorbyl-3-phosphate disodium salt.

In accordance with the above procedure, but starting with the corresponding L-ascorbyl-3-phosphate tripotassium salt, di(L-ascorbyl-3-phosphate)trilithium salt, di(L-ascorbyl-3-phosphate)tricalcium salt, and di(L-ascorbyl-3-phosphate)trimagnesium salt, there are obtained the corresponding L-ascorbyl-3-phosphate dipotassium salt, L-ascorbyl-3-phosphate monolithium salt, L-ascorbyl-3-phosphate monocalcium salt and L-ascorbyl-3-phosphate monomagnesium salt.

In accordance with the above procedure, but using 100 ml. of 2N-hydrochloric acid, there is obtained the corresponding L-ascorbyl-3-phosphate monosodium salt, L-ascorbyl-3-phosphate monopotassium salt, di(L-ascorbyl-3-phosphate)monolithium salt, di(L-ascorbyl-3-phosphate) monocalcium salt and di(L-ascorbyl-3-phosphate)monomagnesium salt.

EXAMPLE 3

35.8 gms. (0.1 mol) of L-ascorbyl-3-phosphate trisodium salt are suspended in 40 ml. of acetone under nitrogen and there is added thereto 5.73 ml. (0.1 mol) of glacial acetic acid over 2 hours at 15° C. The mixture is stirred for an hour and 200 ml. of methanol added thereto. The mixture is stirred for a further hour at 40° C., filtered and the filter cake washed with methanol and the product dried at 40° C. in vacuo. There is thus produced the L-ascorbyl-3-phosphate disodium salt.

In accordance with the above procedure, but starting with the corresponding L-ascorbyl-3-phosphate tripotassium salt, di(L-ascorbyl-3-phosphate)trilithium salt, di(L-ascorbyl-3-phosphate)tricalcium salt, and di(L-ascorbyl-3-phosphate)trimagnesium salt, there are obtained the corresponding L-ascorbyl-3-phosphate dipotassium salt, L-ascorbyl-3-phosphate monolithium salt, L-ascorbyl-3-phosphate monocalcium salt and L-ascorbyl-3-phosphate monomagnesium salt.

In accordance with the above procedure, but using 11.46 ml. (0.2 mol) of glacial acetic acid, there is obtained the L-ascorbyl-3-phosphate monosodium salt, L-ascorbyl-3-phosphate monopotassium salt, di(L-ascorbyl-3-phosphate)monolithium salt, di(L-ascorbyl-3-phosphate) monocalcium salt and di(L-ascorbyl-3-phosphate)monomagnesium salt.

EXAMPLE 4

To 176 g. (1.0 mol) of L-ascorbic acid suspended in 198 ml. of acetone at −10° C. under nitrogen is added a mixture of 239.4 g. (0.95 mol) of pyrophosphoryl chloride in 250 ml. of acetone over 4 hours at −10° C. The mixture is stirred an additional hour at 0° C. and quenched by adding 322 ml. of water over 1 hour at 25° C. To this solution is added 40 percent aqueous sodium hydroxide until the pH is 2. Separation and concentration of the acetone layer gives L-ascorbyl-3-phosphate as a pale liquid. The material does not consume iodine or indophenol and absorbs at 237 $\mu$ in the ultraviolet.

EXAMPLE 5

25.6 gms. (0.1 mol) of L-ascorbyl-3-phosphate are dissolved in 30 ml. of acetone under nitrogen. There are added thereto 10.6 gms. (0.1 mol) of solid anhydrous sodium carbonate and the mixture stirred at 25° C. for 2 hours. The mixture is then filtered and 200 ml. of methanol added thereto. The reaction mixture is stirred for a further hour at 40° C., cooled to 15° C. and filtered, the residue washed with methanol and dried in vacuo at 40° C., the product being the L-ascorbyl-3-phosphate di-sodium salt.

In accordance with the above procedure, but starting with potassium carbonate, lithium carbonate, magnesium carbonate and calcium carbonate, there are obtained L-ascorbyl-3-phosphate dipotassium salt, L-ascorbyl-3-phosphate monolithium salt, L-ascorbyl-3-phosphate monomagnesium salt and L-ascorbyl-3-phosphate monocalcium salt.

In accordance with the above procedure, but using one equivalent of metal base in place of two equivalents of metal base, there is obtained the corresponding L-ascorbyl-2-phosphate monopotassium salt, di(L-ascorbyl-3-phosphate)monolithium slat, di(L-ascorbyl-3-phosphate) monomagnesium salt, and di(L-ascorbyl-3-phosphate)monocalcium salt.

What is claimed is:

1. A process for the preparation of ascorbyl-3-phosphate and the alkali or alkaline earth metal salts thereof which comprises suspending a compound selected from the group consisting of ascorbic acid and the alkali metal or alkaline earth metal salts thereof in an oxygenated non-hydroxylic solvent, sequentially treating with a phosphorylating agent, selected from the group consisting of phosphoryl halides, phosphoric and halophosphoric acids and the corresponding anhydrides thereof at between about −20° and 10° C., water and an alkali or alkaline earth metal base respectively.

2. A process according to claim 1 wherein the ascorbyl moiety is the L-ascorbyl moiety.

3. A process according to claim 1 wherein the phosphorylating agent is phosphoric chloride, phosphoric bromide, phosphoric acid, dichloro phosphoric acid, chloro phosphoric acid, bromo phosphoric acid, pyro phosphoric chloride, pyro phosphoric bromide or poly phosphoric acid.

4. A process according to claim 3 wherein the base is the hydroxide or the carbonate of sodium, potassium, lithium, magnesium or calcium.

5. A process according to claim 4 for the preparation of a trialkali or trialkaline earth metal salt of L-ascorbyl-3-phosphate which comprises using an excess of the base.

6. A process according to claim 5 wherein the phosphorylating agent is phosphoryl chloride.

* * * * *